(12) United States Patent
El-Amawy

(10) Patent No.: US 7,245,831 B2
(45) Date of Patent: Jul. 17, 2007

(54) OPTICAL PACKET SWITCHING

(75) Inventor: Ahmed A. El-Amawy, Baton Rouge, LA (US)

(73) Assignee: Board of Supervisors of Louisiana State University And Agricultural and Mechanical College, Baton Rouge, LA (US)

( * ) Notice: Subject to any disclaimer, the term of this patent is extended or adjusted under 35 U.S.C. 154(b) by 0 days.

(21) Appl. No.: 11/227,593

(22) Filed: Sep. 15, 2005

(65) Prior Publication Data

US 2006/0072566 A1    Apr. 6, 2006

Related U.S. Application Data

(60) Provisional application No. 60/615,697, filed on Oct. 4, 2004.

(51) Int. Cl.
*H04J 14/00* (2006.01)
(52) U.S. Cl. .......................... 398/51; 398/54
(58) Field of Classification Search .......... 398/4, 398/51, 54, 58; 370/218, 223, 224, 249, 370/400
See application file for complete search history.

(56) References Cited

U.S. PATENT DOCUMENTS 4,970,717 A * 11/1990 Haas .......................... 370/249

2004/0190845 A1 * 9/2004 Chen ........................ 385/122

* cited by examiner

*Primary Examiner*—Dalzid Singh
(74) *Attorney, Agent, or Firm*—John H. Runnels; Bonnie J. Davis

(57) ABSTRACT

Optical Packet Switching (OPS) is considered the most desirable switching technology for the ubiquitous optical networks that carry internet traffic. OPS could provide for great flexibility, capacity, efficiency, and bandwidth utilization that current switching strategies are not capable of providing. Despite its great appeal, OPS has been hampered by some major hurdles that prevented its practical implementation. Among such hurdles are optical buffering, optical processing/update of headers and to a lesser extent synchronization. This document introduces a novel technique for implementing packet switching in the optical domain. The new approach makes it possible to find efficient and cost effective solutions to the major problems that traditionally rendered optical packet switching (OPS) impractical. The new approach is applicable to any network topology. A complete suite of solutions to all aspects of optical packet switching that take full advantage of the basic novel approach are described. We present a complete set of solutions to the issues of buffering, header processing/update, regeneration, and synchronization among others. The new approach and affiliated solutions make it possible to implement OPS directly over WDM thus offering a very flexible optical layer capable of meeting future demand in a cost effective way.

13 Claims, 13 Drawing Sheets

Illustration of the basic concept

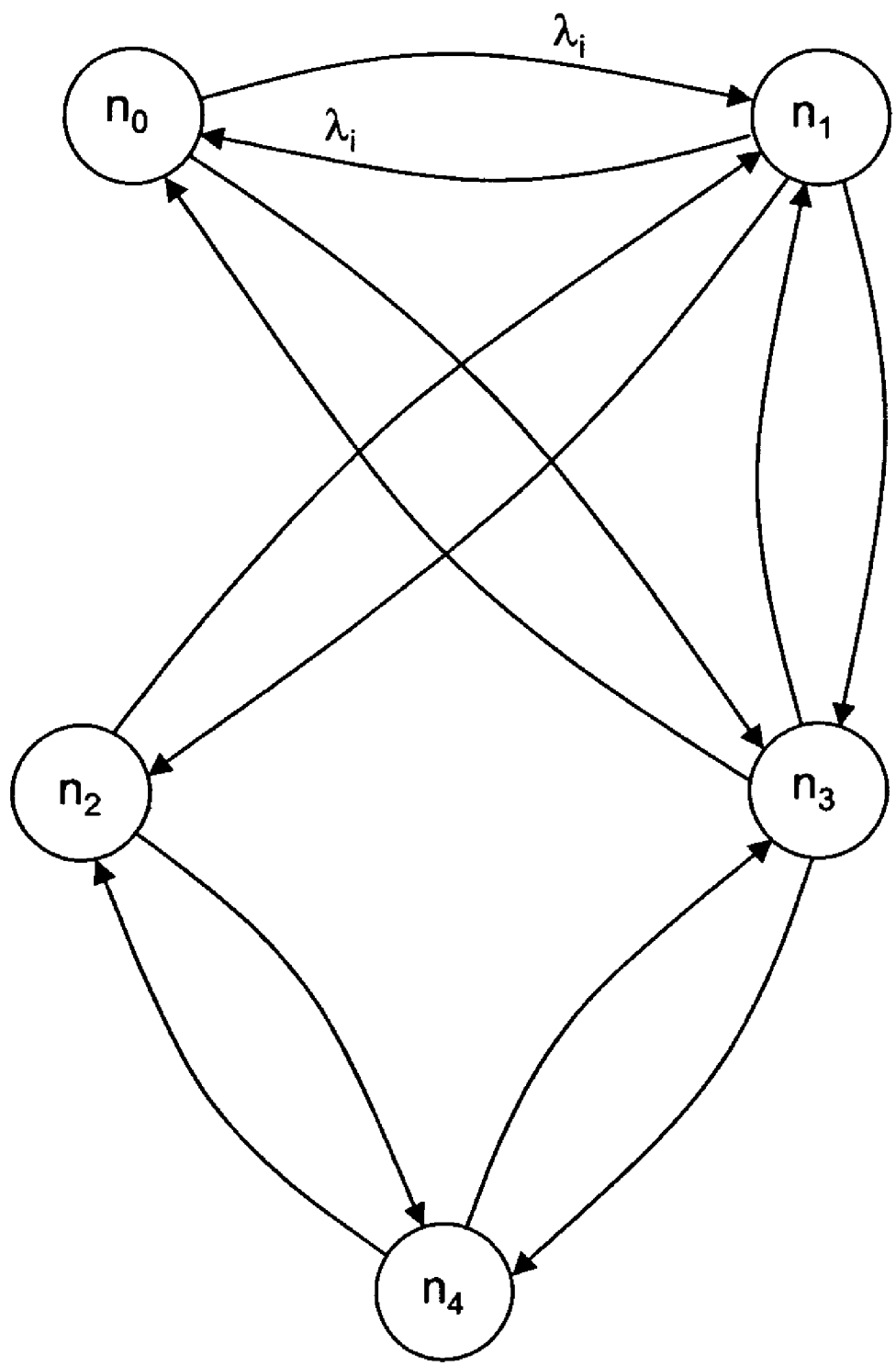
Figure 1: Illustration of the basic concept

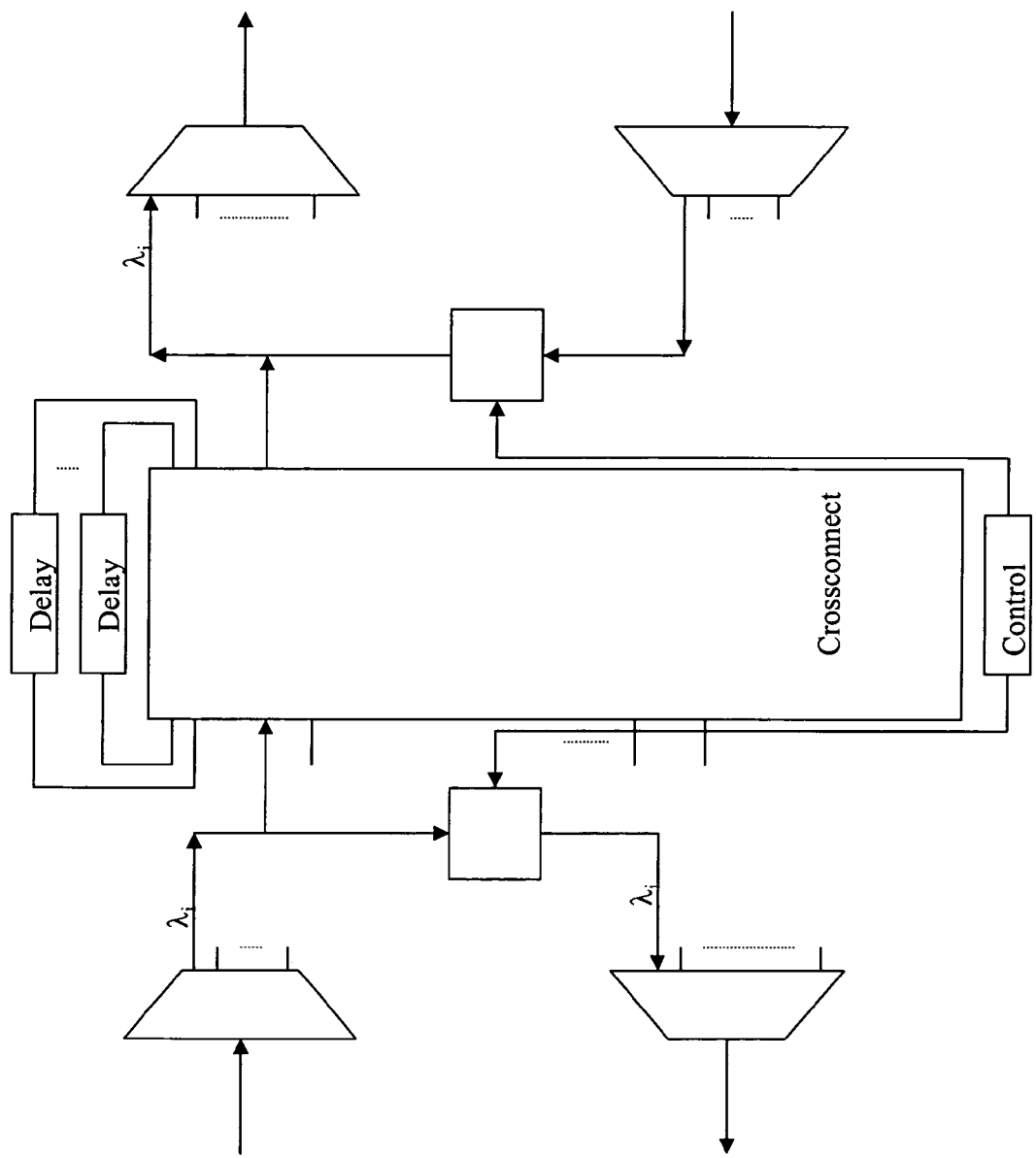
Figure 2: Possible node architecture

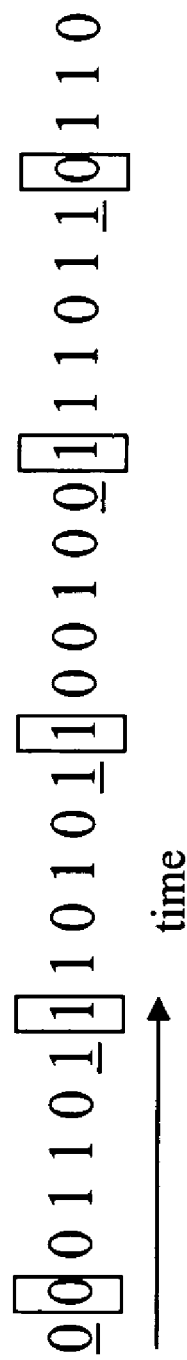
Figure 3: An example: the underlined bits are sampled during the first pass through the FPL. In the second pass boxed bits are sampled,... and so on.

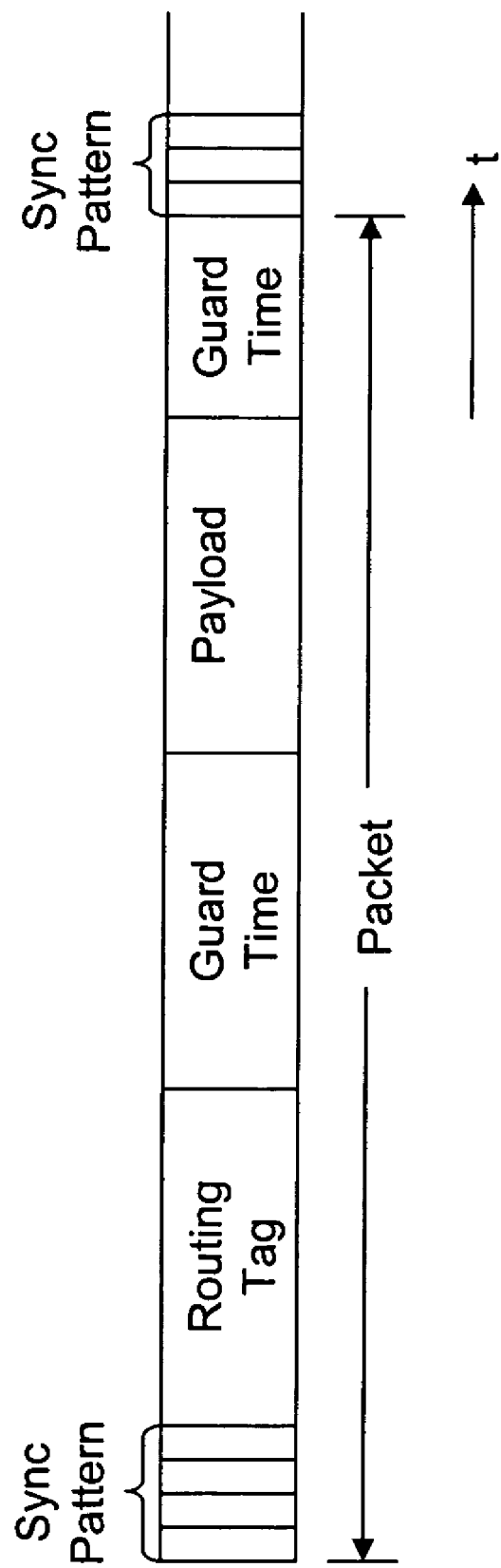
Figure 4: An example packet format

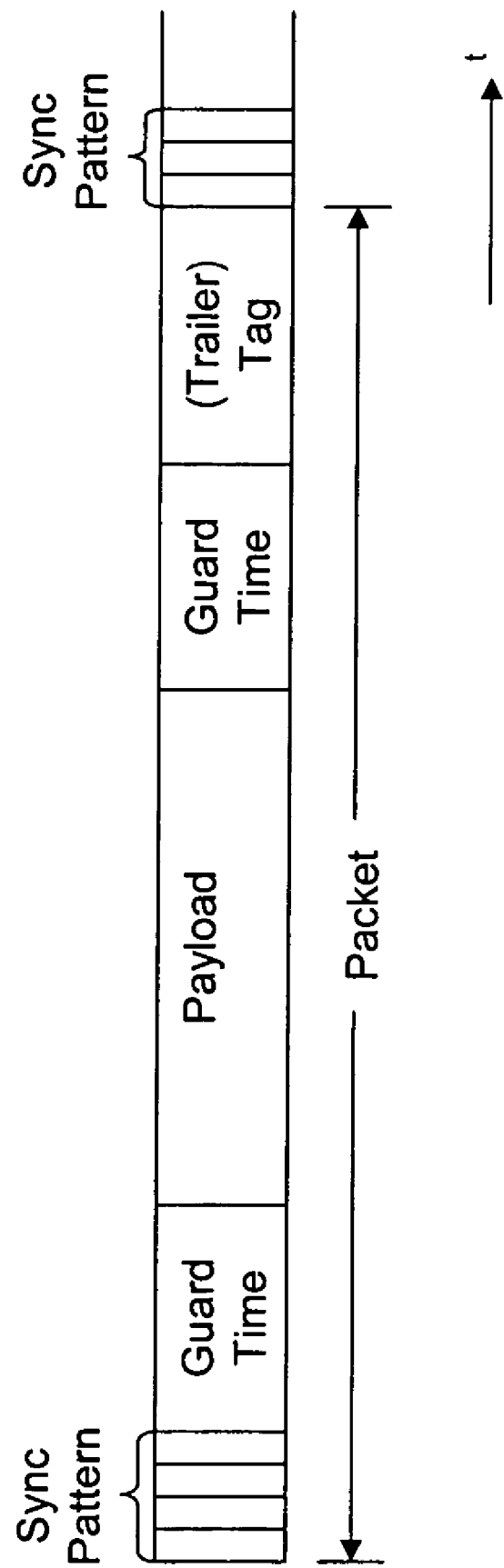
Figure 5: A packet format where the tag is placed after the payload

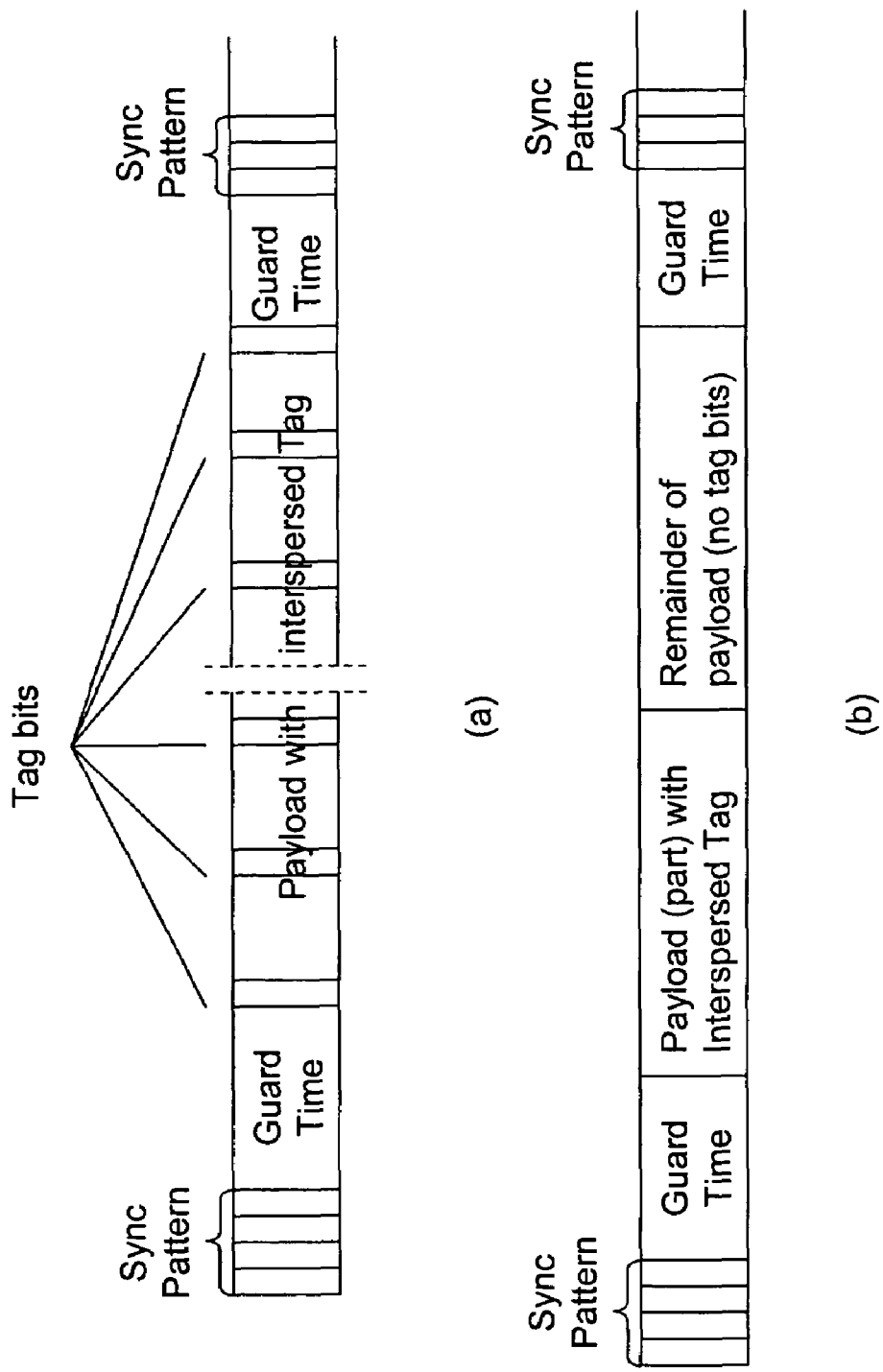
Figure 6. Two possible formats with in-band Tag (a) Tag interspersed with entire payload; (b) Tag interspersed with part of payload

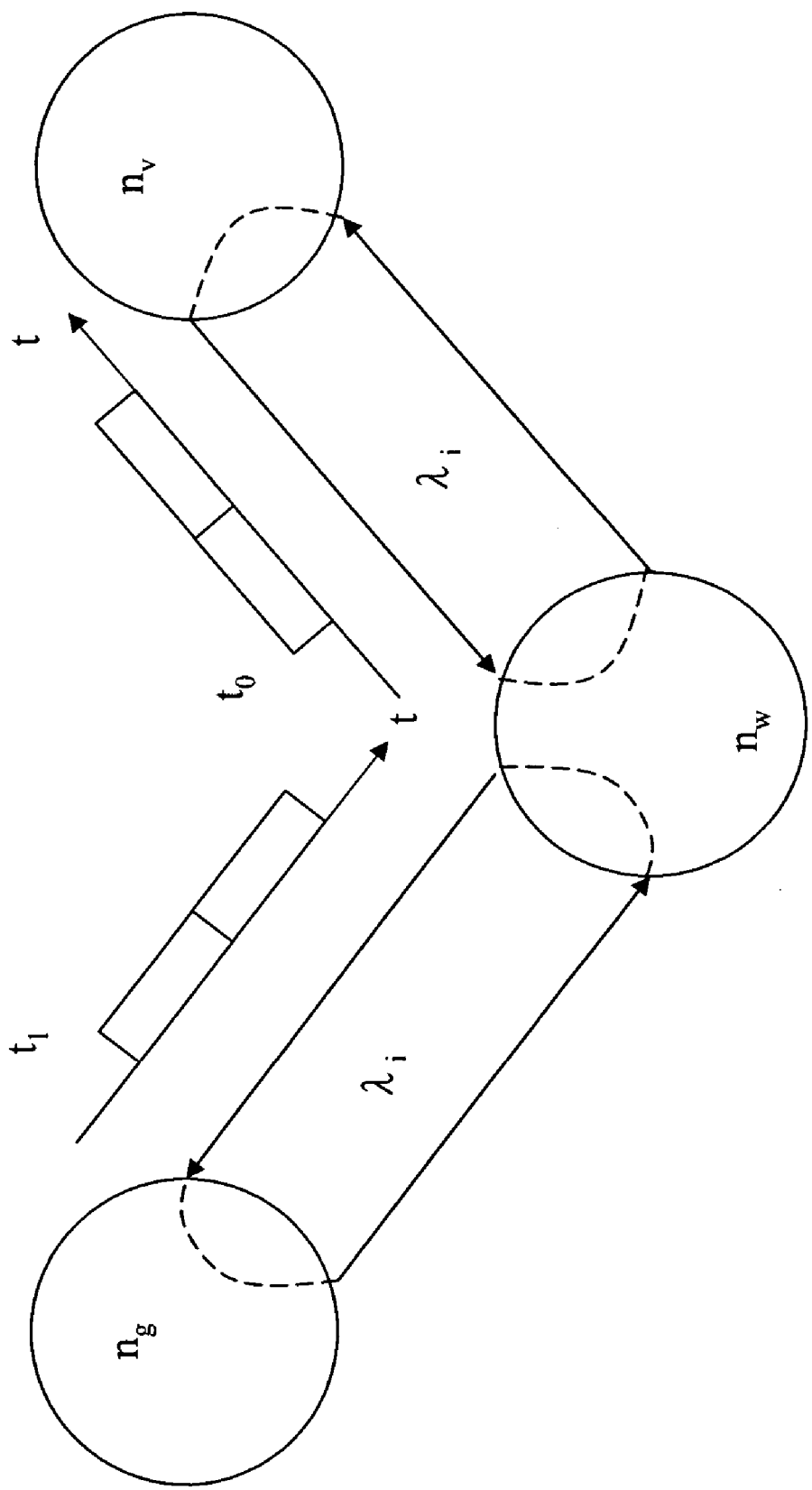
Figure 7: Illustration of synchronization between two adjacent FPL's.

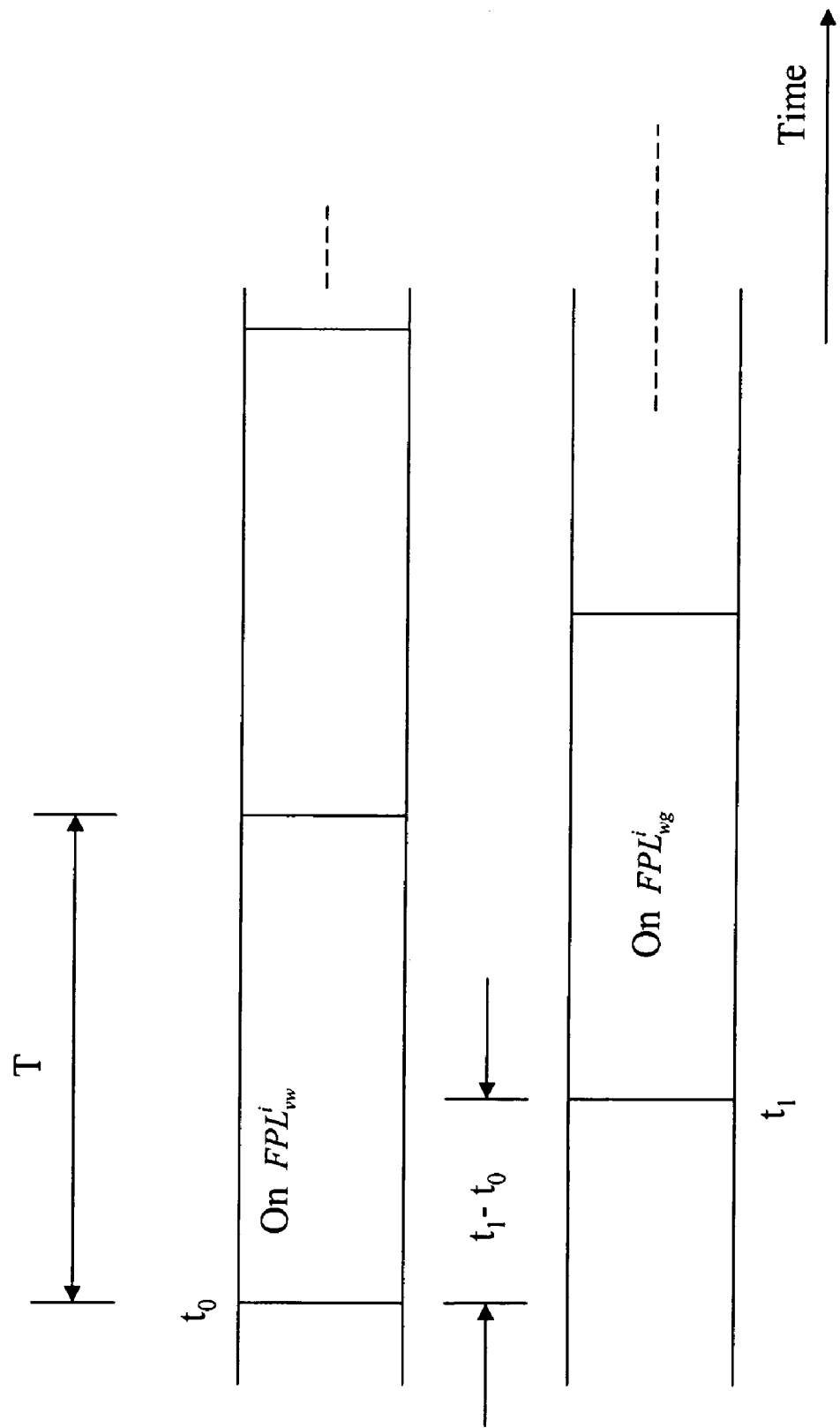
Figure 8: Illustration of inter-slot synchronization timing. $\delta vg = t_1 - t_0$ is the slot gap Between $FPL^i_{vw}$ and $FPL^i_{wg}$

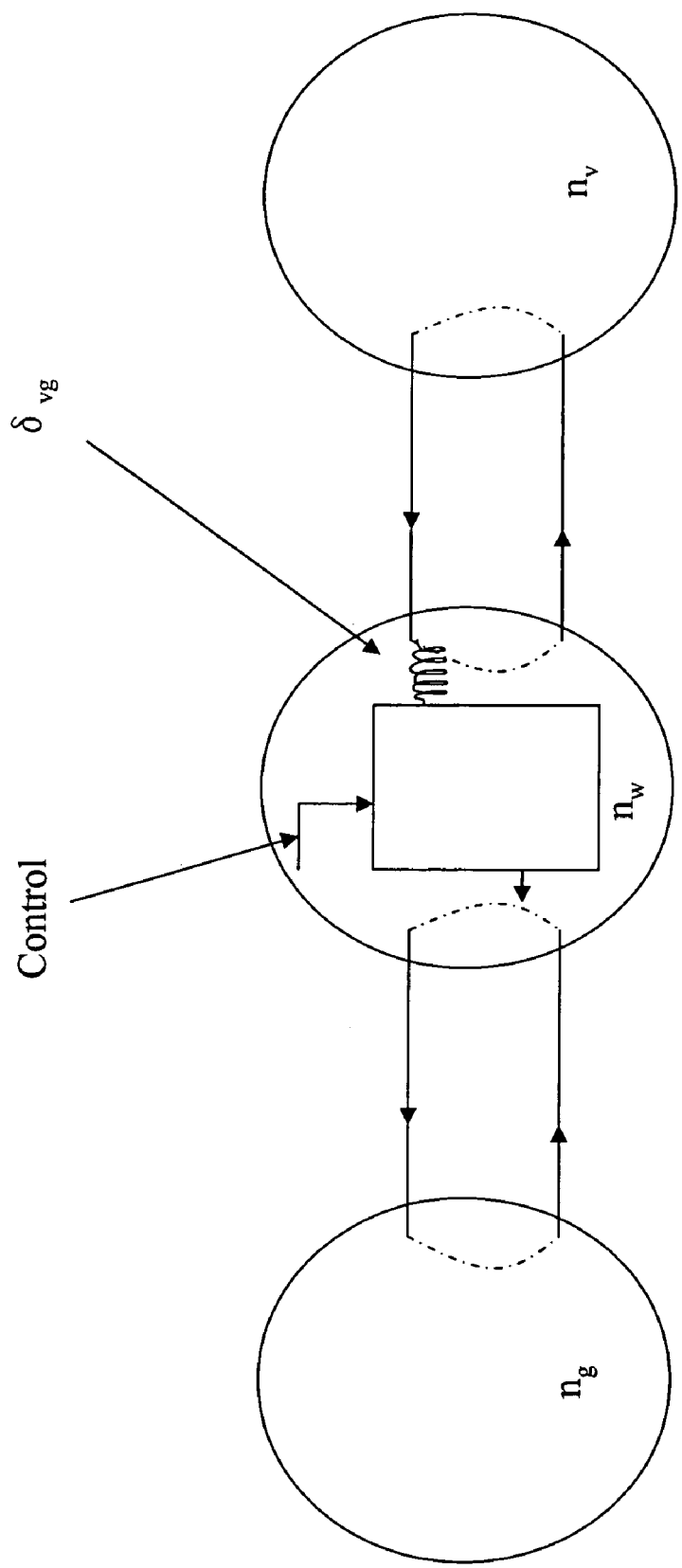
Figure 9: Conceptual view of inter-FPL synchronization strategy

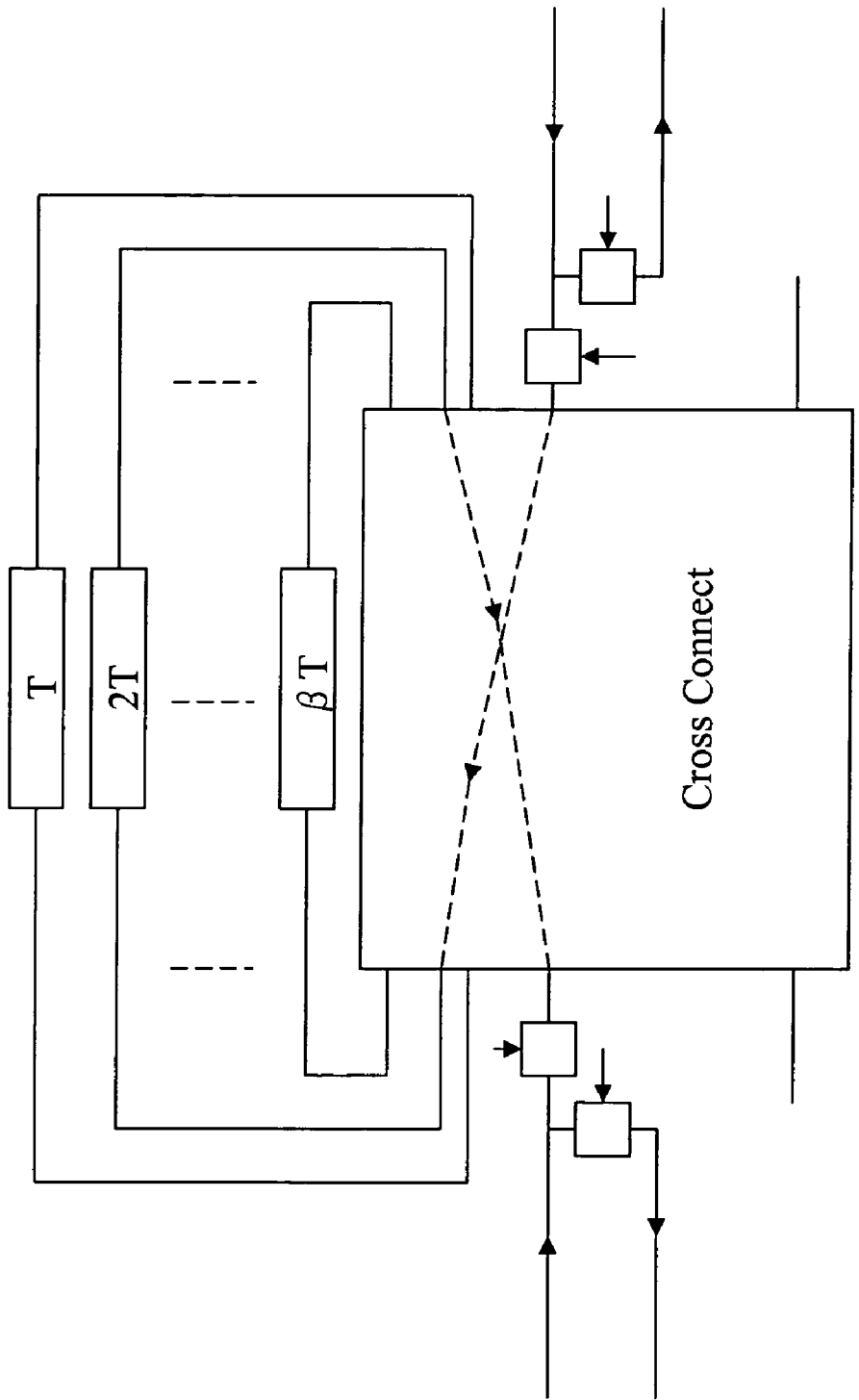
Figure 10: Illustration of multiple delay line concept. $\beta$ is the maximum number of slots of timing difference. For clarity only one FPL is shown. Dotted lines show the case where the packet is delayed 2 slots.

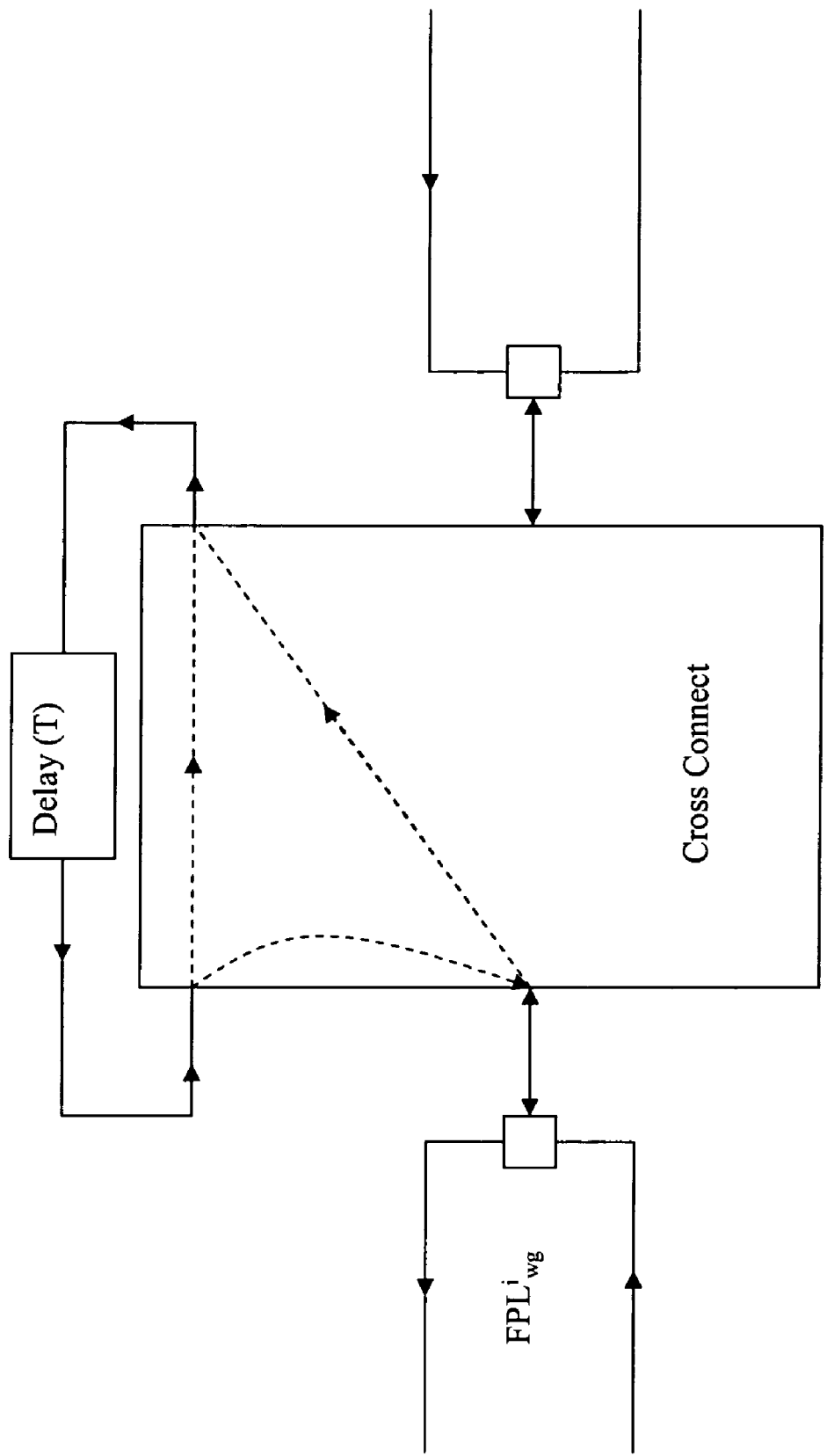
Figure 11: packet relocation using one delay line. A packet on $FPL^i_{wg}$ moves to the delay line circulates α times (for a delay of αT) and is then inserted on $FPLi_{wg}$.

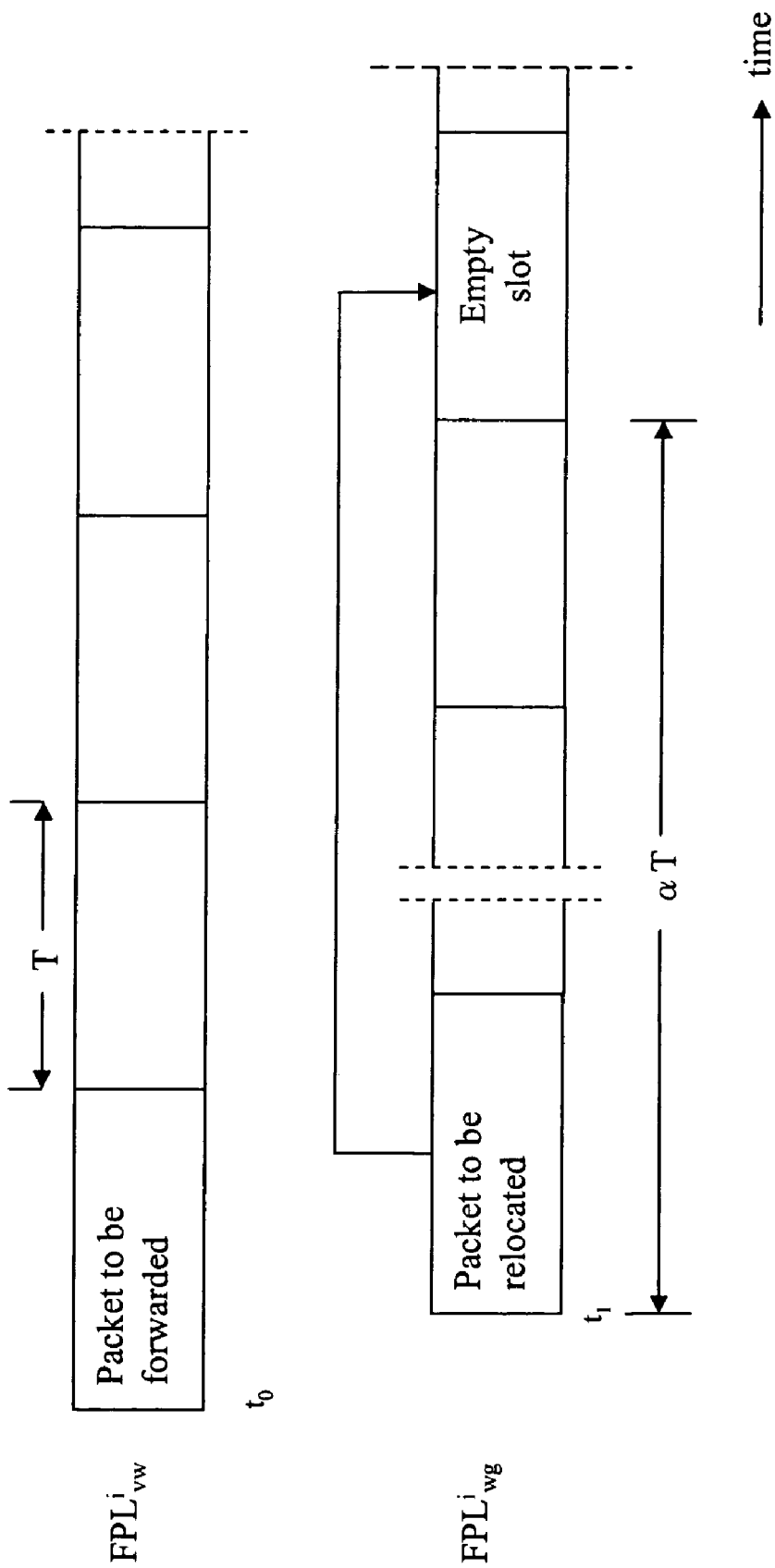
Figure 12: Illustration of packet relocation. After relocation, the slot at t1 on $FPL^i_{wg}$ becomes free.

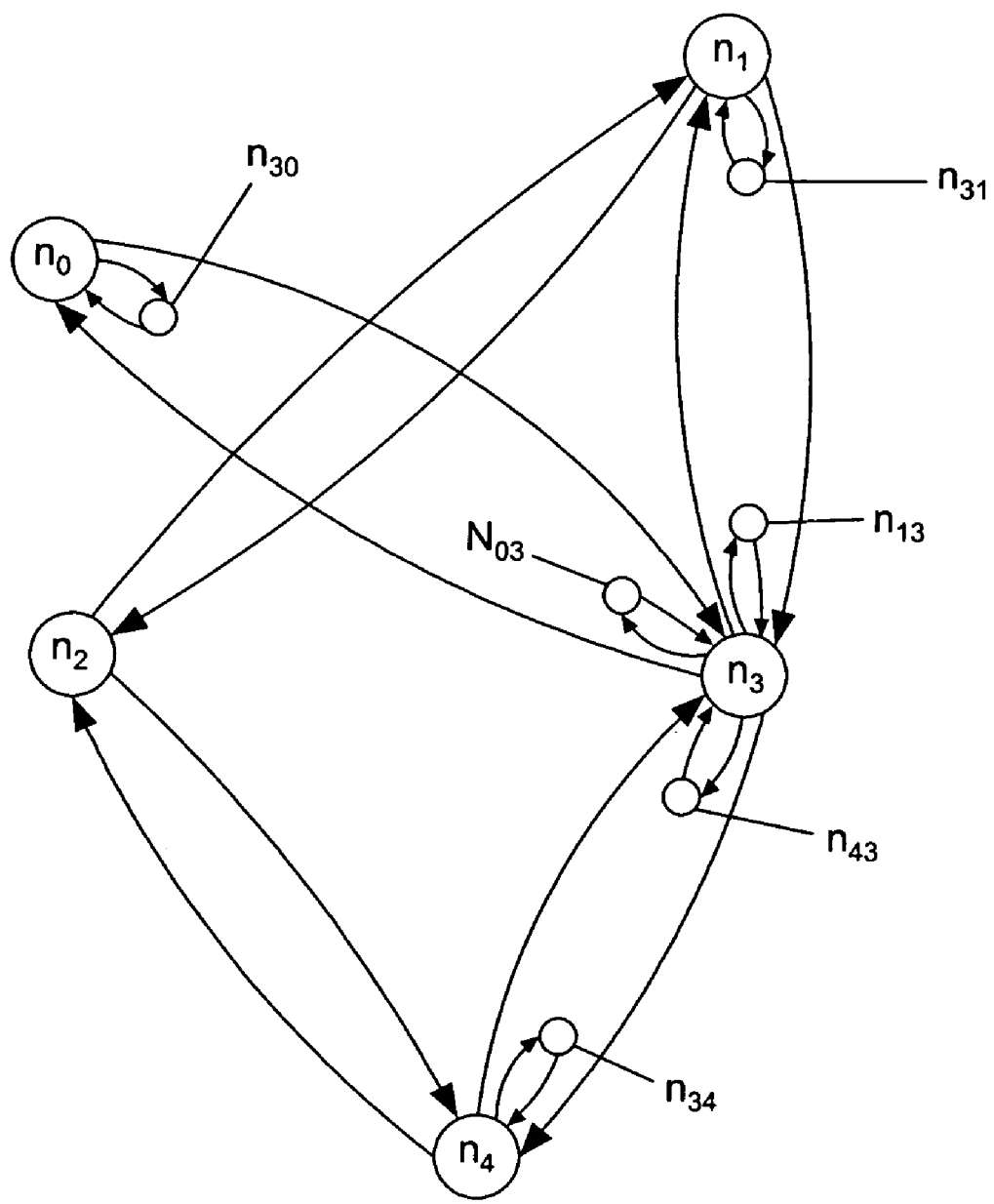
Figure 13: The concept of Satellite nodes and Satellite FPL's.

OPTICAL PACKET SWITCHING

The benefit of the Oct. 4, 2004 filing date of provisional application 60/615,697 is claimed under 35 U.S.C. §119(e).

The tremendous increase in internet use in the last few years presented a set of challenges to the networking industry. The exponential growth in demand for bandwidth has been combined with an obvious need to integrate different traffic types, namely, voice, video and data in a transparent and efficient manner. Advances in Wavelength Division Multiplexing (WDM) and other enabling technologies made it possible to meet or exceed the demand on bandwidth thus far. It has recently been predicted [10] that in the future a single fiber will be able to carry in excess of a thousand wavelengths. This is mainly due to improvements in optical fiber technology by which the water absorption peak in the fiber's attenuation curve has been eliminated. Ramaswami [9] states: "Over the last two decades, extraordinary technological innovations in this (optical fiber) field have consistently delivered higher and higher bandwidth over longer distances, while successfully continuing to reduce the cost per bit transmitted". Indeed, experimental systems have achieved in excess of 10 Tbps transmission rate over a distance of 100 km [1].

Although WDM technology allowed for multiplying network capacity, the current utilization of WDM is mostly based on static allocation of wavelengths. Moreover, the vast majority of current deployments are based on point-to-point connections [1], [6], [12]. Such networking environment fails to take advantage of the vast capability of optical communications. In [6] the authors state that "While current applications of WDM focus on relatively static usage of individual wavelength channels, optical switching technologies enable fast dynamic allocation of WDM channels. The challenge involves combining the advantages of these relatively coarse-grained WDM techniques with emerging optical switching capability to yield a high-throughput optical platform directly underpinning next generation networks."

A very important aspect of network design is the switching strategy. Of all the known switching strategies it is well established and agreed upon that optical packet switching (OPS) is the most desirable in future optical networks [6], [7], [11], [12]. Besides allowing for full utilization of the tremendous potential offered by photonic transmission and switching of signals, OPS can offer greater flexibility, efficiency, throughput, data rate/format transparency and re-configurability [11], [6], [7], [9], [12]. Furthermore, the importance of OPS in the natural evolution of the Internet has been well recognized and reported [6], [7], [11]. However, OPS has been hampered by several technological hurdles that prevented it from being practical. Several notable research efforts have been undertaken in order to overcome these hurdles [3], [6], [7].

This invention provides a novel approach to optical packet switching. We describe in detail how the new approach overcomes the major hurdles to implementing OPS with current technology. We present a complete set of solutions for different aspects affiliated with the new approach in an integrated framework. It is worth emphasizing that the new approach is applicable to network topology including meshed and arbitrary topologies.

Optical Packet Switching: The New Approach

In the current state of technology there are three major hurdles to implementing optical packet switching. These problems can be generally classified into three categories: Optical buffering; Optical processing of header information/header update; Synchronization of packets at node switch in slotted OPS.

We introduce and detail new techniques that will significantly reduce the difficulty associated with these problems to the extent of making OPS possible using current technology.

Basic Concepts in the New Optical Packet Switching Approach

The basic idea centers around using loops of wavelength channels between nodes for buffering the packets instead of fiber loops or fiber delay lines at the nodes. As shall be seen, this core idea will lead to efficient solutions to the major technological problems that make it difficult or impossible to implement OPS with today's technology. FIG. 1 shows a network with arbitrary topology that uses OPS in accordance with the proposed concepts and FIG. 2 shows a possible node architecture. The link between any two adjacent nodes will be assumed to consist of at least two unidirectional fibers. A packet (or a set of packets) will normally be circulating on the same wavelength in the two directions. In other words, the same wavelength on two opposite direction fibers will form a loop, which we will call Fiber Pair Loop (FPL for short) on which the packet will circulate until it is possible to advance it to the next link (actually loop) on its path to the destination. It may be desirable to use a term like "wavelength pair loop" or "wavelength loop" or some other appropriate name. However we will adhere to the FPL notation so as to emphasize our preference for two separate fibers. The fact that each loop uses a single wavelength will be emphasized by a superscript as we discuss next.

We will use the notation $FPL_{01}^i$ to denote the FPL between node $n_0$ and $n_1$ using wavelength i. We imply by this notation that $n_0$ is the node that injected (or admitted) the packet onto this FPL. We will also call such a node as the "admitting node". The node on the other end of the FPL will be called the "non-admitting node". It is clear that a pair of fibers on a link between two nodes may carry multiple FPL's corresponding to multiple wavelengths. Each of these will be uniquely identified by a superscript that corresponds to the wavelength used. The system can be unslotted (asynchronous) or slotted (synchronous). In the former case, at most a single packet may exist on an FPL at a time. In the slotted case multiple packets may exist on the FPL concurrently with each packet occupying a time slot. In general, we will assume equal (fixed) length packets in the slotted case.

We will use the following example to illustrate concepts. Consider FIG. 1 and assume that a packet has been generated by node $n_1$ and that it is destined to $n_4$. In the un-slotted case node $n_0$ will select a free wavelength on the $n_0$-$n_1$ link, say $\lambda_i$ which will be reserved in both directions. We assume that when a node acquires a wavelength $\lambda_i$ on a given link it will actually reserve $\lambda_i$ in both directions of the FPL on that link. In the slotted case $n_0$ waits for a free slot on any $FPL_{01}^i$ and then injects the packet onto that FPL at that slot. An alternative view of things is to assume that the FPL's are permanently established and that something(s) are always circulating on them. We will dwell on this analogy shortly. Once $n_0$ injects the optical packet on $FPL_{01}^i$, that packet will circulate (or be stored) on that FPL until node $n_1$ is ready to advance it to the next FPL on its way to the destination. For the time being, assume that attenuation losses and distortion are of no concern. We will address these issues shortly.

The packet on $FPL_{01}^i$ may thus circulate until the next $FPL^j$ is available. Assume that $FPL_{112}^i$ is now available. Then node $n_1$ will wait until the boundary of the packet on $FPL_{01}{}^i$ is observed and will then switch it onto $FPL_{12}{}^i$. Notice that we assume that the optical cross connect is capable of independently switching an input port to a given output port so long as both ports are free. Such a switch has been reported in [13]. Notice also that guard spaces in packet format may be used to allow for slight variation in payload and header positioning. [$n_1$ may delay the packet slightly to allow it to discover the boundary]. Once this occurs, $FPL_{01}{}^i$ [or a slot on it that corresponds to that packet] becomes free and may therefore be used by another packet. This process may be repeated at other intermediate nodes until the packet is received and consumed by the ultimate destination; $n_4$ in our example. It is to be emphasized that in our approach the packet does not cross the switch until it is allowed to advance from one FPL to the next or until it reaches the destination.

It is possible to make a crude analogy of the proposed approach with a system of circularly moving conveyer belts in a factory setting. The belts carry objects with means for transporting an object from one belt to another at appropriate moments in time. Under this scenario FPL's are permanently established and an object on a moving belt will correspond to a time slot on the FPL carrying it.

BRIEF DESCRIPTION OF THE DRAWINGS

FIG. 1 depicts a network with arbitrary topology that uses OPS in accordance with the proposed concepts.

FIG. 2 depicts a possible node architecture.

FIG. 3 depicts sampling every $6^{th}$ bit of the packet payload.

FIG. 4 depicts an example packet format.

FIG. 5 depicts a packet format where the tag is placed after the payload.

FIG. 6 depicts two possible packet formats.

FIG. 7 depicts two FPL's, where both FPL's involve node $n_w$.

FIG. 8 depicts the gap between $FPL_{vw}{}^i$ and $FPL_{wg}{}^i$ remaining constant with time.

FIG. 9 depicts a conceptual view of inter-FPL synchronization.

FIG. 10 depicts an illustration of the multiple delay line concept.

FIG. 11 depicts packet relocation using one delay line.

FIG. 12 depicts packet relocation.

FIG. 13 depicts satellite nodes and satellite FPL's.

ISSUES RELATED TO THE NEW SCHEME

Deadlocks: A network employing the new scheme would not be any more prone to deadlocks than any other network using packet switching (optical or otherwise). However, since wavelength channels are used in pairs in this scheme it is recommended that at least two pairs of fibers exist between any given pair of adjacent nodes (say $n_x$ and $n_y$). One pair would be controlled by $n_x$ and used for traffic flow from $n_x$ to $n_y$ and the other used by $n_y$ for $n_y$ to $n_x$ traffic. Alternatively, the two pairs may be shared equally between the two end nodes and access is granted on dynamic basis through a simple handshake protocol. For the case of slotted networks (which will be addressed later), actually one pair may be adequate for transporting packets in both directions. However, in that case it might be advisable to limit packet injection onto any given FPL such that at least one slot is always free. This should guarantee deadlock-free operation; i.e., a scheme like injection limitation [4] would be desirable to avoid deadlocks.

Signal Attenuation: We now describe some novel schemes to take care of attenuation issues at low cost. Moreover what we describe here will not interfere with the behavior of the new scheme from a functional view point.

It is well known that optical fibers are not perfect. A packet traveling on a fiber link will be subjected to some attenuation losses and to some distortion [1], [8]-[12]. In current practice an optical signal is amplified every 100 km or so and is regenerated every several hundred to a few thousand kilometers [1], [9]. The decision on how often to regenerate the signal (every how many kilometers) is dependent on the acceptable bit error rate [11]. Regeneration involves optical to electronic conversion and then electronic to optical conversion (O-E-O). Ideally, once the signal is regenerated, the induced and accumulated noise is removed and the signal is again in its original and clean form.

In our scheme we actually store the packet on the FPL's making up the path to the destination. Clearly if the total distance traveled on all the FPL's on the path is less than the mandatory regeneration distance (for example 3,000 kilometers), then we will not need to regenerate the signal. However, if it does, then regeneration is clearly needed. One way to handle this in our scheme at low cost is described next:

Packet Sampling: Suppose a packet is circulating on $FPL_{01}{}^i$. Every time the packet makes a traversal over that loop, the node that did not inject it onto $FPL_{01}{}^i$ (the non-admitting node) makes an electronic copy of every $k^{th}$ bit. For instance, if k=6 then the node will sample every $6^{th}$ bit of the packet payload as illustrated in FIG. 3.

In this case the sample electronics can be much slower then the data transmission rate and therefore much cheaper.

Two cases exist:

If the packet stays on the FPL>k circulations, we have a clean electronic copy which can be used to replace the circulating packet during the $k+1^{st}$ traversal of the non-admitting node; the node that is supposed to forward the packet to the next FPL. Notice that this case is equivalent to having loss-less FPL from a functional point of view and conversion to electronic form is inconsequential insofar as OPS is concerned. This means that electronic conversion is totally transparent to the OPS scheme. This is equivalent to saying: if we were able to employ loss-less FPLs, things would be identical to the current scheme from a functional and packet flow points of view. Notice also that once a packet is regenerated it need not be re-injected it into the FPL from which it was sampled. In fact its time slot can be marked as "free" on that FPL. When conditions are right for forwarding the non admitting node will use the electronic copy to re-inject the packet on the next FPL in optical form. It is interesting to observe that once the non-admitting node has a complete electronic copy of the packet it could use any wavelength in the next hop. This has a fairness effect to it since that packet will have a higher probability of finding an empty slot immediately.

Packet circulates≦k times and then it advances to the next FPL. In this case the packet will advance without being regenerated and the partial copy made at the non-admitting node is discarded. The amount of attenuation/distortion is a function of how many times the packet circulates. If it circulates k−1 times, then the amount of attenuation/distortion is maximum. If this same packet circulates k−1 times on the next FPL and the FPL after that and so on, the accumulated attenuation/distortion could exceed the maximum acceptable for reliable operation. For that reason it is suggested that a field in the packet format should contain a count that indicates the total (accumulated) number of circulations without regeneration at any given point in time. If this number exceeds a certain threshold then we must force the packet to circulate at least k times on the current FPL to automatically force regeneration. A more accurate measure would be the total distance traveled without regeneration. Such a parameter will not be hard to implement since the actual length of each FPL is known. The number of circulations may be an acceptable approximation that would work well if FPL's are of comparable length. It is to be noted that k need not be the same for every FPL on the path.

The circulation count (or distance) can be attached before the payload, after the payload or concurrent with the payload as in the sub-carrier modulation (SCM) scheme [7], [11]. This issue will be revisited later. However the basic scheme will work well as described. Note that every time a packet is regenerated on a given FPL the associated circulation count (or traveled distance) field is cleared back to zero. Also it is assumed and expected that long links will have EDFA's.

Notes: It is possible to have the admitting node itself take care of regeneration (rather than the non-admitting node). In this case it will start copying bits as non admitting node when the packet is on the previous FPL and continue to sample bits while the packet is on the current FPL as admitting node. It is also possible for the admitting node to monitor the status of the packet on the current FPL. If it remains for too long (for reasons of congestion or deadlock), the admitting node may drop the packet from the current FPL and re-introduce it into another FPL on an alternative route, again as the admitting node.

Packet Regeneration: Above we described a method for low-cost sampling of a packet for the purpose of regeneration if need be. Once we have a clean electronic copy of the packet we can convert it back into optical form. However if we are to reinject the packet at the fiber link's data rate in one step, we would need to use high speed electronics. This may seem like a compromise which allows us to sample the data at low cast but use high cost hardware to write it back. In other words low cost O-E but higher cost E-O. However we can do better. In the following we describe a novel idea for performing low cost E-O regeneration as well.

The idea centers around using a short delay loop for assembling the bits of a packet in a time multiplexed way. For now assume synchronization issues are not of concern. Suppose that we have a fiber loop (which we will call fiber assembly loop or FAL) with a known fixed delay of T. Assume that T is larger than the length of the packet $T_p$. If we inject a bit on that FAL, the bit will appear at the injection point at times T, 2T, 3T, etc. So we write the bits of the packet in a manner similar to the manner we read it in the above described sampling method If k=6, in the first visit to the injection point we can write bits 1, 7, 13, . . . In the second visit we can write bits 2, 8, 14, . . . and so on. After 6 visits we have assembled the entire packet. This will take approximately 6T units of time. In general the writing process will take kT units of time. To minimize the time this regenerated packet stays on fiber we can time regeneration such that the trailing end of the kT units needed to assemble the packet coincide with (or be slightly after) the $k^{th}$ visit of the packet to the non-admitting node. One other possibility is that we time events such that we finish regenerating all the bits except for the last group (the $k^{th}$ group) immediately prior to the $k^{th}$ arrival of the packet to the non-admitting node. At that point we can read the $k^{th}$ group and regenerate it in real time (read a bit then write it). Alternatively we can time events such that the end of the $k^{th}$ arrival on the FPL coincides with end of the $k^{th}$ arrival of the packet on the FAL. Notice that this concept can be used to regenerate packets on FPL's by reading every $k^{th}$ bit as discussed earlier but in addition rewriting the bits sampled on the previous traversal.; i.e. bits sampled in visit number j will be written back in regenerated form during visit number j+1. So, after k+1 visits to the "regenerating" node we will have regenerated the whole packet.

Buffering: Buffering in electronic networks is done using read/write random access memory (RAM). At this time there is no equivalent technology for the optical domain [6], [7], [11]. Therefore research in OPS has focused on using fiber delay lines or fiber loops for packet storage at the nodes. In some other proposals deflection routing was suggested for conflict resolution/buffering [11].

Our approach to OPS utilizes the circulation of the packets on inter-node links for buffering the packets. The obvious drawback of this approach is that it always requires the use of pairs of (same) wavelength on separate fibers in opposite directions. Thus wavelengths are used in pairs and not as individual wavelengths. This apparent drawback is tempered by several factors:

1. Wavelengths can be abundant. In Dense Wavelength Division Multiplexing (DWDM) each fiber can carry literally hundreds of wavelengths. In [1] Alwayn states that: "Typical DWDM systems use lasers that have a bit rate of up to 10 Gbps (OC-192/STM-64) and can Multiplex up to 240 wavelength". In reference [10] it has been recently predicted that more than 1000 wavelength on a single fiber will be possible with a newly developed fiber technology that does not have the water absorption peak.
2. The use of FPL's will eliminate the need for costly optical buffering at the nodes themselves.
3. The benefit of being able to implement OPS with current technology outweighs having to use more wavelengths per packet transmission, i.e.; the great flexibility and efficiency offered by OPS are well worth the cost.
4. The use of existing fibers between the nodes for buffering provides some great advantages that may not be obvious:
   (a) The longer FPL's provide for larger delays which will make it feasible to use packets with much larger payloads; a very desirable feature in OPS [11].
   (b) Long fibers are likely to be supported by EDFA's regardless of the switching technique used [9]. An EDFA is needed every 100 km or so in current practice to avoid excessive attenuation. With other proposals requiring buffering at the nodes, a second set of amplifiers would be needed at the nodes if the packet "wait" or "buffering" time exceeds a certain threshold.
   (c) The relatively long delays incurred by the FPL's will allow for efficient slotted implementation in which multiple (possibly long) packets share the same FPL.
   (d) To accommodate long packets under an in-node buffering scheme requires the use of very long and bulky fiber loops at the nodes, an unnecessary expense given that FPL's already exist in the network. Our scheme will rely on delay lines at the nodes for synchronization purposes and at much lower cost as we shall discuss later.
   (e) A higher level of multiplexing of packets on the links is possible giving rise to very high link utilization.

(f) The relatively long delays mask out the time to process/update the header information so that time is well utilized.

In summary, our OPS scheme offers an elegant solution to optical buffering that utilizes existing network fiber links and amplifiers for efficient buffering. Furthermore, it makes longer packets feasible. It also makes it possible and desirable to utilize slotted packet transmission which increases the link utilization efficiency significantly.

Header Processing/Header Update: One of the most challenging aspects of an all optical implementation of OPS is how to read, process, and update the header in the optical domain [6], [7], [9], [11]. The difficulty arises from the fact that optical processing technology is still in its infancy and is unlikely to be practical anytime soon. There have been some attempts at performing simple header processing operations in the optical domain [3]. However, we believe that optical header processing will not advance adequately to be useful in the near future. We directly quote from [7]: "Pure OPS in which packet header recognition and control are achieved in an all-optical manner, is still many years away. For medium-term network scenarios, OPS using electronic control and header processing is more realistic; indeed, it is not clear what major advantages the all-optical approach has to offer over this opto-electronic approach". If we were to assume that header processing/update is to be done in the electronic domain then we must be able to solve another set of problems. Consider as an example the packet format shown in FIG. 4 (this format was assumed in the European KEOPS project [6]).

After synchronization, the header (or routing tag) has to be read (converted to electronic form), processed and then rewritten so as to update it. If the header is transmitted at the payload rate (1040 Gbps) it might not be easy to just read it at these speeds, due to the big mismatch between optical and electronic speeds. Even if the electronics to read the header at these speeds were readily available, it would likely be expensive. A much more difficult problem is to process the header and update it in time. The only way this can be done is by delaying (or buffering) the packet until the processing is complete whether or not the next link is available. It has been suggested [6], [11] that the header could be transmitted at lower bit rates. This may solve the problem of reading it economically but the problem of delaying the packet until the new header is ready remains. We quote from [11]: "Although there are various techniques to detect and recognize packet headers at gigabit-per-second speed either electronically or optically it is still difficult to implement electronic header processor at such high speed to switch packets on the fly."

We now describe some novel approaches for dealing with the header.

Header Sub-Carrier Multiplexed (SCM) with Payload: Assuming that any given packet will circulate on any FPL such that the non-admitting node is visited at least twice, then we need not employ any delay at the node for the purpose of processing and updating the header. We can encode the header information at much lower bit rates than the payload and transmit it concurrently in time with the payload using sub-carrier multiplexing (SCM) [11]. This scheme which has received growing interest lately is well suited for our approach. During the first pass the SCM header is recognized (or read) with (normal/inexpensive) electronics then it is processed while the packet makes its circulation around the FPL. On the second arrival at the non-admitting node the new header is written using SCM. Notice that the packet can advance to the next FPL on the second arrival to the non-admitting node of the current FPL. This approach once again uses the existing FPL delay to concurrently perform header processing/update at no extra cost. The key here is the requirement that the packet must make at least one and one half circulations. As soon as the packet reaches the non-admitting node the second time around it will be ready for advancing to the next FPL if conditions warrant. The disadvantage of SCM is that it puts some limit on payload data rate [11].

Tag Follows Payload: Another interesting approach would be to place the tag after the payload Again, if we require that the packet makes at least 1½ circulations, then the placement of the tag (what we used to call the header) can be arbitrary. It can be placed before, after, or concurrent (as in SCM) with the payload.

Placing the tag after the payload has the following non-obvious advantages. It is possible to do without the synchronization pattern at the beginning of the packet. This is because the payload itself can be utilized as synchronization bits to synchronize the local phase locked loop (PLL) or clock recovery circuit. Further, since the payload is fairly long, comparatively, requirements on the PLL response time can be relaxed resulting in lower cost.

It is worth pointing out that by placing the tag after the payload we still have to deal with the issue of fast electronics for reading the tag. However, the issue of processing/update is not a problem as in case (a) above. We might have to use lower bit rate tag to enable sampling at the multi Giga bits/s rates.

In-Band Tag: Here we propose an idea based on time division multiplexing by which we intersperse the tag within the payload bits. In this case we inject tag information within the payload in an interspersed manner with regular spacing between tag bits. For instance every $12^{th}$ bit can be a tag bit. In this case header processing logic reads every $12^{th}$ bit. At the end of the packet time we have the full header to process and make ready for update of the packet tag on the next arrival at the non-admitting node. The advantages of this approach are:

low cost electronics full utilization of bit rate within the payload.

Notice that it is possible to spread the tag over the entire payload or to confine it to part of the payload followed by no-tag bits portion of payload. FIG. 6 shows these two possible packet formats. Notice also that circulation count (or distance traveled), discussed earlier can also be part of the interspersed tag or it can be encoded separately.

We wish to emphasize here that this scheme solves the cost as well as the header processing/update issues.

This concept is novel in this context but the idea of interspersing control information with the data has been employed in SONET/SDH protocols [1]. But in the previous cases the interspersing was not done at the bit level and was done for other reasons.

Synchronization: OPS can be slotted (synchronous) or unslotted (asynchronous). The unslotted case is a lot simpler to deal with. As mentioned in [11] synchronization at the nodes is not complex.

For slotted networks the situation is more involved [11], [6]. Here we assume fixed length packets. We suggest some schemes and introduce the concept of optical packet relocation.

Consider a hypothetical situation in which packet circulation on all FPL's is synchronized at the global level. Notice that we require that the FPL's (and not necessarily the nodes) be synchronized. This objective can be achieved by distributing a global clock or by periodically adjusting the clock at the controlling node for each FPL. Such technology is not difficult to implement and approaches similar to what is being currently followed in SONET are likely to be adequate.

Now consider the two FPL's shown in FIG. 7 where both FPL's involve node $n_w$.

From $n_w$'s point of view $FPL_{vw}{}^i$ and $FPL_{wg}{}^i$ are synchronous. Let "$t_1$" be the starting time of the first packet arriving at $n_w$ on $FPL_{wg}{}^i$ following the arrival of the packet starting at "$t_0$" on $FPL_{vw}{}^i$. The difference $t_1-t_0=\delta_{vg}$ will correspond to the slot synchronization gap between $FPL_{vw}{}^i$ and $FPL_{wg}{}^i$. Under ideal circumstances this gap will remain constant with time. FIG. 8 illustrates the concept:

Under such circumstances, a packet moving from $FPL_{vw}{}^i$ to $FPL_{wg}{}^i$ will only need to be delayed by a fixed amount of $t_1-t_0=\delta_{vg}$ in order to be brought to slot synchronization (boundary) on its new FPL. We demonstrate this in FIG. 9 with a fixed delay inserted between the two FPL's. Notice that the delay $\delta_{vg}$ will include the fixed delay, the switch delay and any other delays inherent in the path within the node between these FPL's. A highly dispersive fiber delay line can be utilized for implementing this slot synchronization delay function.

Recall that our notation implies that $FPL_{vw}{}^i$ is controlled by node $n_v$ (the admitting node) and that $FPL_{wg}{}^i$ is controlled by node $n_w$.

Under non-ideal circumstances $t_1-t_0=\delta_{vg}$ will change with time due to drift in the clock frequencies. However, using techniques such as those utilized in SONET [1] it is possible to guarantee synchronization within a certain range of tolerance. That combined with a short "guard time" in the packet format should take care of the drift/jitter problems.

The above discussion assumes that a packet moving from $FPL_{vw}{}^i$ to $FPL_{wg}{}^i$ will find an immediate empty slot on $FPL_{wg}{}^i$. The question then becomes: what if the slot on $FPL_{wg}{}^i$ next in time to $FPL_{vw}{}^i$ is not free? In general there are 3 scenarios:

1. The next slot on $FPL_{wg}{}^i$ is not available but some other slot (say a slots later) is free and available. In this case we can
   (a) Delay the packet from $FPL_{vw}{}^i$ till that free slot on $FPL_{wg}{}^i$ reaches $n_w$. This will require a delay of $\alpha T+\delta_{vg}$ for this case (T is slot length in time). This approach will require employing a node structure with multiple delay lines corresponding to all possible timing differences between the two FPL's in concern as shown in FIG. 10. Alternatively we can utilize a fixed number of delay lines say $L$,; $1<L<\beta$ and simply wait till one of the first L slots becomes free. This way the cost and complexity of node hardware can be controlled.
   (b) Move the packet that begins at $t_1$ on $FPL_{wg}{}^i$ to an empty slot on that FPL so as to make the slot at $t_1$ free for use by the packet moving from $FPL_{vw}{}^i$ to $FPL_{wg}{}^i$. This situation can be handled with a single delay loop in node $n_w$ with delay value being T. In this case we move the packet starting at $t_1$ on $FPL_{wg}{}^i$ to the slot delay line, circulate it a times and then re-inject it on $FPL_{wg}{}^i$. Meanwhile this frees the slot starting at t, for the packet moving from $FPL_{vw}{}^i$ to $FPL_{wg}{}^i$. The actual writing of this moving packet will take place on the next arrival of the packet to node w.
   (c) Preempt and replace on the fly: In this scheme we remove the packet that begins at $t_1$ on $FPL_{wg}{}^i$ temporarily from the FPL to the single delay loop while concurrently writing the packet moving from $FPL_{vw}{}^i$ to $FPL_{wg}{}^i$ to the freed slot at $t_1$. We then wait for the first free slot on $FPL_{wg}{}^i$ to re-inject the preempted packet. This scheme requires that packet format allow for flexibility in the actual positioning of the payload within the time slot; i.e. we must have some reasonable amount of guard space surrounding the payload. This may increase the overhead in terms of space but can expedite packet movement and reduce latency.

2. Next slot at $t_1$ is free. In this case we delay the packet by $\delta_{vg}$ and move it to $FPL_{wg}{}^i$.

3. No slot is free on $FPL_{wg}{}^i$. In this case we wait until a slot on:
   (i) $FPL_{wg}{}^i$ or (ii) $FPL_{wg}{}^j$ is free and then follow either scenario (a) or scenario (b) above.

In case (i) the same wavelength "i" is used. In case (ii) another wavelength "j" is used assuming that the packet circulated>k times. [Notice that if fast electronics for making electronic copy on the fly are available then case (ii) may be doable even with fewer circulations]. Notice also that for packet relocation (FIG. 11) it is equally possible to use a set of delays with delay values of T, 2T, 3T, ..., $\beta T$ as was illustrated in FIG. 10 ($\beta+1$ is the number of packets/FPL). In this case the delay to choose is determined based on the relative timing of the free slot boundary and $t_1$.

FIG. 11 shows a node structure capable of supporting the novel idea of packet relocation/rearrangement. FIG. 12 shows a relocation timing example.

It is interesting to note that free slots can be managed and controlled in such a way that will help in establishing different quality of service (QoS) levels (or differentiated services). For example some slots may be reserved for use by packets of a given priority. Other slots may be used by packets of priority greater than a certain level etc. Please observe that we might leave one or more slots free to allow for easy and fast packet relocation in addition to the benefit of deadlock avoidance. The more free slots we have the higher the chance of finding a "free nearby slot". An important observation on the effect of packet relocation on packet tracking information at FPL end nodes follows.

Packet Tracking: As packets circulate on an FPL it is desirable for the end nodes of the FPL to keep track of the packets that have visited them earlier. If this was always possible then once the non-admitting node makes the routing decision, it would wait for the packet in concern to arrive on the next traversal and would then switch it to the next FPL (not withstanding the synchronization issues). A potential problem therefore is: How do we keep track of packets if packet relocation is used? There are a few ideas for dealing with this issue. Next, one approach is discussed.

An interesting approach is to associate a 2-bit status field and a local packet ID (which is relevant to the current FPL only) with each packet. This information corresponds to a mini-tag that can precede the payload at a slightly lower rate to allow on the fly reading and processing. The status field indicates one of the following sates: 1—free slot 2—relocated packet 3—normal packet or 4—newly inserted packet.

The local ID indicates the ID on the current FPL and is assigned by the admitting node on the FPL as it admits the packet to that FPL.

Thus, before switching a packet from an FPL to another, the node in concern checks the local ID and the status field. If these match the expected value based on the previous traversal of the packet, the packet is advanced to the next FPL. The node that admits the packet to the next FPL will assign it a new local ID relevant only to that "new FPL" and will mark it as new packet. On the second traversal it will be marked as "normal". If that packet is later relocated the designation will be changed to "relocated". That way packets can be kept track of. Notice that with this approach each packet will have a global Tag (or header) and a local ID that is re-assigned at each FPL. The second is fairly short and simple and can be processed on the fly.

Cost-Free Wavelength Conversion: An interesting observation is that if a packet has circulated on $FPL_{vw}{}^i$ more than the threshold number k (that triggers regeneration) such that we have an electronic copy of it at $n_w$ then we can use any wavelength for which the slot immediately following $t_0$ on $FPL_{vg}{}^k$ is free. So here we achieve no cost conversion of wavelength to avoid having to rearrange the packets. It may also be desirable on demand (as network conditions may warrant) to deliberately force a packet to circulate>k times in order to be able to use any free wavelength on the next FPL. Please note with availability of fast electronics for on the fly copying, then a packet may be converted to another wavelength on demand even if it circulates fewer than k times.

Controlling Latency: A very important issue in conjunction with the proposed scheme (with any scheme for that matter) is latency. Because packets may circulate multiple times on an FPL till the next hop becomes available, it is possible for latency to grow to unacceptable levels. We now propose a novel scheme for controlling latency. One way to control and reduce latency is to introduce "satellite" nodes on long links for the purpose of controlling FPL delays. Instead of circulating the packet on long FPLs we divert them to satellite FPL's with much shorter delays. For example consider FIG. 1. If the FPL between $n_1$ and $n_3$ is very long we can place a satellite node of $n_3$ on that FPL at a pre-calculated distance from $n_3$ and a satellite node for $n_1$ at a predetermined distance from $n_0$. Consider a packet that was admitted by $n_1$ into $FPL_{13}{}^i$. As the packet reaches $n_3$ for the first time it is sent back for circulation between $n_3$ and its satellite on that FPL we call this node $n_{31}$. The length of the new FPL between $n_3$ and $n_{13}$ is calculated to optimize one or more parameters. If $n_{13}$ is placed too close to $n_3$, a few packets may coexist on that "satellite" FPL at a time. A longer satellite FPL will allow storage of more packets but will increase the latency. Clearly a compromise has to be struck and analysis is needed to optimize the satellite distances. FIG. 13 illustrates the idea of satellite nodes for the example network of FIG. 1 further assuming that: node pairs ($n_1$ and $n_2$) and ($n_2$ and $n_4$) are physically close enough such that no satellite nodes are needed on their respective FPL's. All other FPL's require satellite nodes.

To illustrate how satellite nodes can help to manage latency, consider FIG. 13 and assume that node $n_1$ is sending a packet on $FPL_{13}{}^i$ to $n_3$. When $n_3$ receives the packet for the first time it will extract the header for processing and will then send the packet for circulation but on the satellite FPL containing $n_{13}$ (which has a much shorter length than $FPL_{13}{}^i$). The packet will re-circulate on this satellite FPL until it is finally forwarded by $n_3$. Notice that moving a packet from $FPL_{13}{}^i$ to the satellite FPL will require synchronization and availability of a slot in much the same way as moving to a non-satellite FPL would require. Also notice that when that satellite FPL is full we have the option of sending the packet all the way back to $n_1$. Alternatively multiple satellite FPL's (possibly with different length) can be utilized for each of the original (long) FPL's).

Comparison with Deflection Routing

It has been suggested that deflection routing can be used for contention resolution/buffering [11]. In that scheme, when more than one packet compete for the same output link a packet that cannot be forwarded to that link is directed to another link that may or may not bring the packet closer to the destination. With deflection routing we still have some major unsolved problems which can be summarized in:
1. How to control signal attenuation and regeneration since the actual route used is not known a priori?
2. How to handle header processing/update on the fly?
3. How to solve the potential livelock problem?

These problems are very difficult to deal with as things stand today. In addition, deflection routing imposes some constraints on network operation that further complicate node design. The scheme described above does not suffer from livelock problems while offering elegant and cost-effective solutions for the others as we detailed earlier.

It is interesting to note that the described scheme can be used in conjunction with deflection routing to obtain yet another scheme void of the problems associated with deflection routing by itself. To solve the livelock problem one can limit the number of misrouting (non-minimal path) steps. This would not be possible with deflection routing by itself.

REFERENCES

1. V. Alwayn, "Optical Network Design and Implementation," Cisco Press, Indianapolis, Ind., 2004.
2. B. Bostica et. al., "Synchronization Issues in Optical Packet Switched Networks," G. Prati, Ed., Springer Verlag, 1997 pp. 362-76.
3. A. Carena et al, "OPERA: An Optical Packet Experimental Routing Architecture with Label Swapping Capability," IEEE/OSA J. Lightwave Tech., vol. 16, no. 12, December 1998, pp. 2135-45.
4. J. Duato, S. Yalamanchilli, and L. Ni, "Interconnection Networks: an Engineering Approach," IEEE Press, Piscataway, N.J., 1997.
5. P. Green, "Progress in Optical Networking," IEEE Communications Magazine, January 2001, pp. 51-61.
6. D. Hunter and 1. Andonovic, "Approaches to Optical Internet Packet Switching," IEEE Communications Magazine, September 2000, pp. 116-122.
7. M. J. Mahony et al., "The Application of Optical Packet Switching in Future Communication Networks," IEEE Communications Magazine, March 2001, pp. 128-135.
8. C. S. R. Murthy and M. Gurusamy, "WDM Optical Networks, Concepts, Design and Algorithms," Prentice Hall, Upper Saddle River, N.J., 2002.
9. R. Ramaswami, "Optical Fiber Communication: From Transmission to Networking," IEEE Communications Magazine, May 2002, pp. 138-147.
10. J. Sewart and A. Galis, Eds., "Deploying and Managing IP Over WDM Networks," Chapter 2, Artech House, Norwood Mass., 2003.
11. S. Yao, B. Mukherjee, and S. Dixt, "Advances in Photonic Packet Switching," IEEE Communications Magazine, February 2000, pp. 84-94.
12. J. Zheng and H. Mouftah, "Optical WDM Networks Concepts and Design Principles," Wiley Interscience/ IEEE Press, Piscataway, N.J., 2004.
13. M. Feldman, A. El-Amawy and R. Vaidyanathan, "Optical Crossbar Switch," U.S. Pat. No. 6,792,175; September 2004.

14. F. Callegati, et. al., "Wavelength And Time Domain Exploitation for QoS Management In Optical Packet Switching," Computer Networks, vol. 44, 2004, pp. 569-582.

I claim:

1. A method for optically transmitting an optical packet from a source node to a destination node in a network of arbitrary topology; wherein the optical packet comprises a header and a payload, wherein the header encodes the address of the destination node, and wherein the payload comrises data to be transmitted to the destination node; said method comprising the sequential steps (a) through (e) of:
 (a) routing the optical packet between two nodes in a network, from a source node to a second node;
 (b) extracting and processing the header at the second node following the initial arrival of the packet at the second node; and transmitting the packet back to source node;
 (c) following receipt of the packet at the source node from the second node, transmitting the packet back to the second node;
 (d) following receipt of the packet at the second node for the second time, replacing the header with an undated header following said processing;
 and either forwarding the packet to a third node, or storing the packet by circulating the packet between the second node and the source node depending on the result of header processing and the availability of a link and wavelength to transmit to a third node; and
 (e) repeating steps (b) through (d) on further nodes in the network, until the optical packet reaches the destination node.

2. A method as recited in claim 1, wherein the header is transmitted at a lower data rate than the payload.

3. A method as recited in claim 1, wherein the header is transmitted concurrently with the payload.

4. A method as recited in claim 1, wherein the header is transmitted before the payload.

5. A method as recited in claim 1, wherein the header is transmitted after the payload.

6. A method as recited in claim 1, wherein the header is transmitted interspersed with the payload.

7. A method as recited in claim 1, additionally comprising the step of regenerating the packet, and replacing the original packet with the regenerated packet.

8. A method for optically transmitting an optical packet from a source node to a destination node in a network of arbitrary topology; wherein the optical packet comprises a header and a payload, wherein the header encodes the address of the destination node, and wherein the payload comprises data to be transmitted to the destination node; said method comprising the sequential steps (a) through (e) of:
 (a) routing the optical packet between two nodes in a network, from a source node to a second node;
 (b) extracting and processing the header at the second node following the initial arrival of the packet at the second node; and transmitting the packet back to source node;
 (c) following receipt of the packet at the source node from the second node, transmitting the packet back to the second node;
 (d) following receipt of the packet at the second node for the second time, replacing the header with an updated header following said processing; and either forwarding the packet to a third node, or storing the packet by circulating the packet between the second node and the source node depending on the result of header processing and the availability of a link and wavelength to transmit to a third node; and
 (e) repeating steps (b) through (d) on further nodes in the network, until the optical packet reaches the destination node;

wherein said method additionally comprises the step, occurring in at least one node, of sampling 1 of every k bits of the optical packet each time the optical packet is received by the node, wherein k is an integer, and regenerating the sampled bits; so that, following k circulations of the optical packet to the node, the entire optical packet has been regenerated.

9. A method as recited in claim 8, wherein the optical packet is regenerated optically in an optical fiber loop.

10. A method as recited in claim 8, wherein the optical packet is regenerated electronically.

11. A method for optically transmitting a plurality of optical packets from a source node to a destination node in a network of arbitrary topology; wherein each optical packet comprises a header and a payload,wherein the header encodes the address of the destination node, and wherein the payload comprises data to be transmitted to the destination node; said method comprising, for each optical packet, the sequential steps (a) through (e) of:
 (a) routing the optical packet between two nodes in a network, from a source node to a second node;
 (b) extracting and processing the header at the second node following the initial arrival of the packet at the second node; and transmitting the packet back to source node;
 (c) following receipt of the packet at the source node from the second node; transmitting the packet back to the second node;
 (d) following receipt of the packet at the second node for the second time, replacing the header with an updated header following said processing; and either forwarding the packet to a third node, or storing the packet; by circulating the packet between the second node and the source node depending on the result of header processing and the availability of a link and wavelength to transmit to a third node; and
 (e) repeating steps (b) through (d) on further nodes in the network, until the optical packet reaches the destination node;

wherein said method additionally comprises the step, when a time slot for transmitting the packet is unavailable, of rearranging the relative positions of the packets on a subsequent link between nodes, to permit the preemption of the transmission of one packet by replacing it with another packet to be forwarded first.

12. A method as recited in claim 11, wherein the preempted packet is circulated through a delay loop until a time slot for transmitting it becomes available.

13. A method for optically transmitting an optical packet from a source node to a destination node in a network of arbitrary topology; wherein the optical packet comprises a header and a payload, wherein the header encodes the address of the destination node, and wherein the payload comprises data to be transmitted to the destination node; said method comprising the sequential steps (a) through (e) of:
 (a) routing the optical packet between two nodes in a network, from a source node to a second node;
 (b) extracting and processing the header at the second node following the initial arrival of the packet at the second node; and transmitting the packet back to source node;

(c) following receipt of the packet at the source node from the second node, transmitting the packet back to the second node;

(d) following receipt of the packet at the second node for the second time, replacing the header with an updated header following said processing; and either forwarding the packet to a third node, or storing the packet by circulating the packet between the second node and the source node depending on the updated header and the availability of a link and wavelength to transmit to a third node; and (e) repeating steps (b) through (d) on further nodes in the network, until the optical packet reaches the destination node;

wherein one or more of the nodes comprise satellite nodes, to which the optical packet may be transmitted if other nodes are temporarily unavailable, in order to reduce the overall latency of said method.

* * * * *